(No Model.)  2 Sheets—Sheet 1.
T. S. COCKCROFT.
MEASURING VESSEL.
No. 404,603. Patented June 4, 1889.
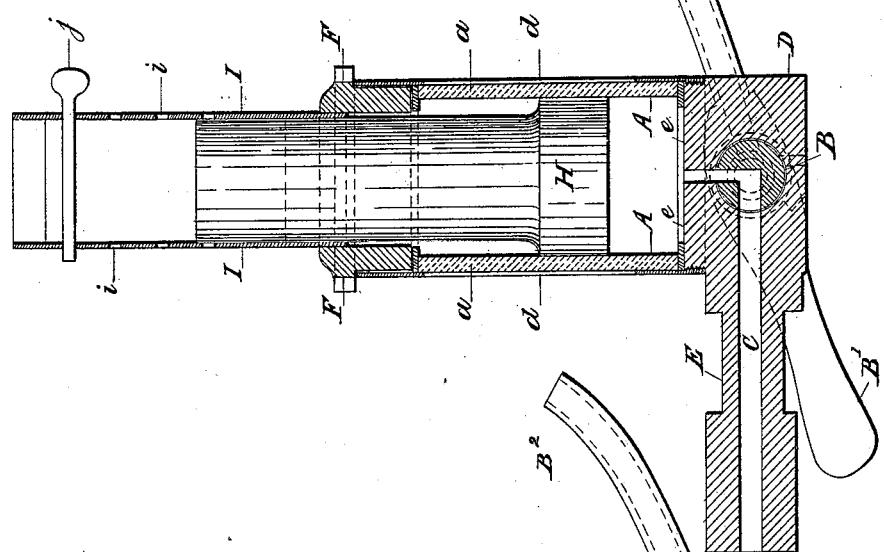
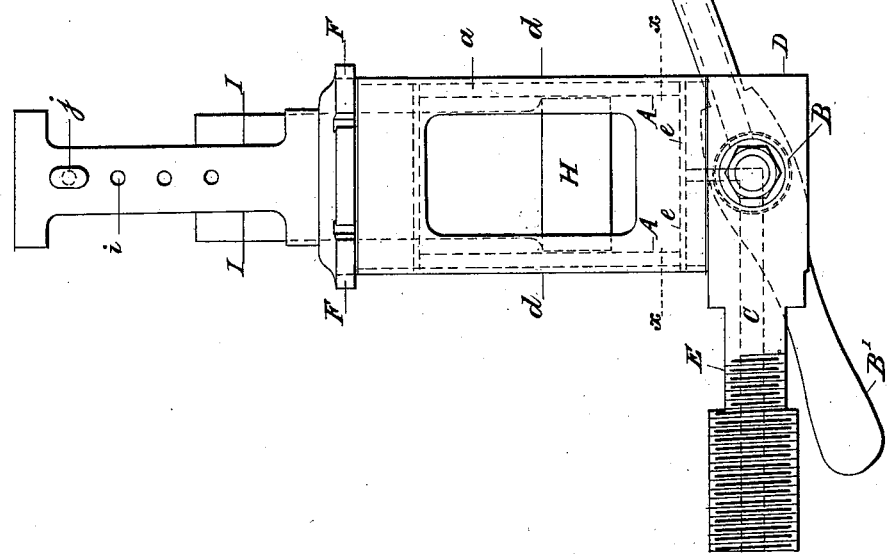
Witnesses. Inventor.
Thomas S. Cockcroft,
By James L. Norris,
Atty.

(No Model.) 2 Sheets—Sheet 2.
T. S. COCKCROFT.
MEASURING VESSEL.
No. 404,603. Patented June 4, 1889.
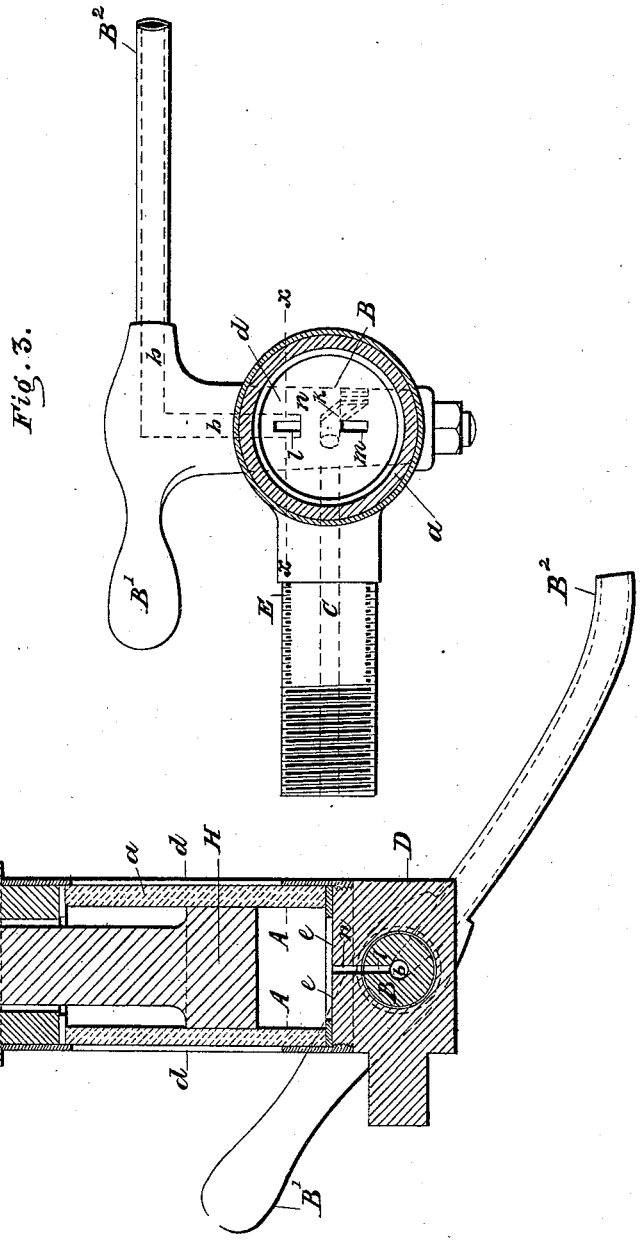
Witnesses.
J. A. Rutherford
Robert Everett
Inventor.
Thomas S. Cockcroft.
By James L. Norris
Atty.

UNITED STATES PATENT OFFICE.

THOMAS SHAW COCKCROFT, OF LIVERPOOL, COUNTY OF LANCASTER, ASSIGNOR TO JOHN GOLDIE CHAPMAN, OF BIRKENHEAD, ENGLAND.

MEASURING-VESSEL.

SPECIFICATION forming part of Letters Patent No. 404,603, dated June 4, 1889.

Application filed March 6, 1889. Serial No. 302,073. (No model.) Patented in England October 13, 1887, No. 13,880.

*To all whom it may concern:*

Be it known that I, THOMAS SHAW COCKCROFT, a subject of the Queen of Great Britain and Ireland, residing at Liverpool, in the county of Lancaster, England, have invented new and useful Improvements in Apparatus for Discharging or Supplying Gaged Quantities of Liquids, (for which I have obtained a patent in Great Britain, No. 13,880, bearing date October 13, 1887,) of which the following is a specification.

This invention has for its object to provide a novel apparatus for measuring quantities of liquid—such as sirup in aerated bottling—and for drawing quantities of oils and alcoholic and other fluids.

The invention consists in the combination of a measuring-vessel having a plunger movable therein and automatically raised by the pressure exerted by the liquid flowing by gravity into said vessel, a valve having radial ports and a longitudinal duct, and a swinging lever-handle fixed upon the outer end of the valve to oscillate in a vertical plane for turning the valve, said lever-handle containing a continuation of said valve-duct and provided with a discharge-nozzle that swings with the lever-handle and communicates with the duct therein.

The invention also consists of certain features of construction and combination of devices, hereinafter described and claimed, reference being made to the accompanying drawings, in which—

Figure 1 is an elevation of an apparatus according to my invention. Fig. 2 is a sectional elevation of the apparatus. Fig. 3 is a plan of the apparatus shown in section through $x$ $x$, Fig. 1. Fig. 4 is a sectional elevation of the apparatus through $x$ $x$, Fig. 3.

The example of my invention shown in the drawings illustrates an apparatus for measuring quantities of sirup in aerated-water bottling.

In the drawings, A is the measuring-vessel.

B is the positively-operating valve, which is so placed between the measuring-vessel A and the supply-duct C that the measuring-vessel A is self-filling by means of the valve B. The valve B is of the "plug" type, and its seat D is formed in the branch E, containing the supply-duct C.

The measuring-vessel A consists of a cylindrical glass tube $a$, held in a metal case $d$ between the face $e$ of the branch E and a packing-gland F. Within the vessel A there is a plunger H, the upper end of which passes through the gland F and through a guide I, provided with holes $i$ and a pin $j$, so that the stroke of the plunger H can be adjusted by setting the pin $j$ through the required holes $i$, and thus the capacity of the vessel can be regulated, for example, to contain one ounce, two ounces, three ounces, or other quantity, as required. The valve B is provided with a handle B' and a nozzle $B^2$ and with a duct $b$, which communicates with the duct of the nozzle $B^2$ and with two ports $k$ $l$. The valve seat or case D has also two ports $m$ $n$. These two ports are so formed and placed that the port $k$ will, on turning the valve B, open the supply-duct C to the port $m$, and so to the vessel A, to fill the vessel, and when the vessel is full, by turning the valve B in a reverse direction, the ports $k$ and $m$ are closed, and the vessel is open to the discharge-duct $b$ and nozzle $B^2$ through the ports $n$ and $l$.

The supply-duct C is connected to a supply-vessel, which is placed at a higher level than the measuring-vessel A, so that upon opening the valve B to the duct C the measure A will by the head or pressure of the liquid fill and be charged with the quantity of liquid for which it is set, the plunger H rising to the gage pin or stop $j$. When full, the measure A is emptied by reversing the movement of the valve B, so that it is closed to the supply and open to discharge the contents of the measure A through the nozzle $B^2$, the plunger H falling as the measure A empties.

To obtain a record of the amount drawn from the supply, the plunger H may be connected by a rod and lever to a registering device of any known and suitable kind—such as a "Harding's" counter—the dials of which are marked to correspond with the variations of the measure.

Having now particularly described and ascertained the nature of my said invention and in what manner the same is to be performed, I declare that what I claim is—

1. In apparatus of the character described for supplying gaged quantities of liquids, the combination of a measuring-vessel having a plunger movable therein and automatically raised by the pressure exerted by the liquid flowing by gravity into said measuring-vessel, a valve having radial ports and a longitudinal duct $b$, and a swinging lever-handle B′, fixed upon the outer end of the valve to oscillate in a vertical plane for turning the valve, said lever-handle containing a continuation of said valve-duct and provided with an attached discharge-nozzle B², that swings with the lever-handle and communicates with the duct therein, substantially as described.

2. In apparatus for supplying gaged quantities of liquids, the combination of the measuring-vessel A, having a valve-case provided with two separated ports $m$ and $n$, arranged in alignment and having the lateral duct C, the oscillating valve B, having a longitudinal duct $b$, and two radial separated ports $k$ and $l$, located out of alignment, and one of which is to communicate with the duct in the valve and the other with a supply-port in the valve-case, and a plunger H, automatically raised by the pressure of the liquid flowing by gravity into the measuring-vessel, substantially as described.

In testimony whereof I affix my signature in presence of two witnesses.

THOMAS SHAW COCKCROFT.

Witnesses:
FREDERICK JOHN CHEESBROUGH,
ERNEST RICHARD ROYSTON,
*Both of 15 Water Street, Liverpool.*